(12) United States Patent
Fujita et al.

(10) Patent No.: US 7,503,297 B2
(45) Date of Patent: Mar. 17, 2009

(54) VALVE DRIVE MECHANISM FOR ENGINE

(75) Inventors: Hideo Fujita, Shizuoka-ken (JP);
Atsushi Suzuki, Shizuoka-ken (JP)

(73) Assignee: Yamaha Hatsudoki Kaisha,
Shizuoka-ken (JP)

( * ) Notice: Subject to any disclaimer, the term of this patent is extended or adjusted under 35 U.S.C. 154(b) by 0 days.

(21) Appl. No.: 11/442,433

(22) Filed: May 26, 2006

(65) Prior Publication Data

US 2006/0266317 A1 Nov. 30, 2006

(30) Foreign Application Priority Data

May 26, 2005 (JP) ............................. 2005-154325

(51) Int. Cl.
*F01L 1/34* (2006.01)
(52) U.S. Cl. ............... 123/90.16; 123/90.15; 123/90.31
(58) Field of Classification Search ............... 123/90.16, 123/90.15, 90.31
See application file for complete search history.

(56) References Cited

U.S. PATENT DOCUMENTS

| | | | |
|---|---|---|---|
| 4,424,790 A * | 1/1984 | Curtil ..................... | 123/559.1 |
| 4,572,118 A | 2/1986 | Baguena | |
| 4,714,057 A | 12/1987 | Wichart | |
| 5,018,487 A | 5/1991 | Shinkai | |
| 5,189,998 A | 3/1993 | Hara | |
| 5,373,818 A | 12/1994 | Unger | |
| 5,601,056 A | 2/1997 | Kuhn et al. | |
| 6,135,075 A | 10/2000 | Boertje et al. | |
| 6,386,162 B2 | 5/2002 | Himsel | |
| 6,422,187 B2 | 7/2002 | Fischer et al. | |
| 6,425,357 B2 * | 7/2002 | Shimizu et al. .......... | 123/90.16 |
| 6,431,129 B1 * | 8/2002 | Hammoud et al. ....... | 123/90.15 |
| 6,481,399 B1 | 11/2002 | Morrn | |
| 6,659,053 B1 | 12/2003 | Cecur | |
| 6,907,852 B2 | 6/2005 | Schleusener et al. | |

(Continued)

FOREIGN PATENT DOCUMENTS

DE 42 23 172 C1 7/1992

(Continued)

OTHER PUBLICATIONS

International Search Report for Application No. PCT/JP03/06202.

(Continued)

*Primary Examiner*—Zelalem Eshete
(74) *Attorney, Agent, or Firm*—Knobbe, Martens, Olson & Bear, LLP.

(57) ABSTRACT

A valve drive mechanism for an engine can include a drive shaft that is configured for rotation about an axis. A valve member is configured to be driven by the rotation of the drive shaft to open and close a valve. A variable valve timing mechanism is positioned at least partially between the valve member and the drive shaft. The variable valve timing mechanism is configured to vary a valve open period of the valve. The valve drive mechanism is configured such that, during a specific operation range, the valve open period includes a main valve open period during which the valve is open in a suction or exhaust stroke, and a sub valve open period during which the valve is open in an expansion or compression stroke.

28 Claims, 14 Drawing Sheets

U.S. PATENT DOCUMENTS

| | | |
|---|---|---|
| 7,069,890 B2 | 7/2006 | Fujita et al. |
| 7,096,835 B2 | 8/2006 | Fujita et al. |
| 7,168,403 B2 | 1/2007 | Fujita et al. |
| 2001/0052329 A1 | 12/2001 | Himsel |
| 2003/0116124 A1* | 6/2003 | Lawrence et al. ........... 123/305 |
| 2005/0126526 A1 | 6/2005 | Fujita et al. |
| 2005/0229882 A1 | 10/2005 | Fujita et al. |
| 2006/0075982 A1 | 4/2006 | Fujita et al. |
| 2006/0102120 A1 | 5/2006 | Fujita et al. |
| 2006/0107915 A1 | 5/2006 | Fujita et al. |
| 2006/0130459 A1* | 6/2006 | Warner et al. ................. 60/286 |
| 2006/0207532 A1 | 9/2006 | Fujita et al. |
| 2006/0207533 A1 | 9/2006 | Fujita et al. |
| 2006/0243233 A1 | 11/2006 | Fujita et al. |
| 2007/0028876 A1 | 2/2007 | Fujita |
| 2007/0204820 A1 | 9/2007 | Fujita et al. |

FOREIGN PATENT DOCUMENTS

| | | |
|---|---|---|
| DE | 19708484 | 9/1998 |
| DE | 10123186 | 11/2002 |
| JP | 61-99707 | 1/1988 |
| JP | 62-9864 | 7/1988 |
| JP | 63-179257 | 7/1988 |
| JP | 62-255538 | 11/1988 |
| JP | 63-309707 | 12/1988 |
| JP | 02-241916 | 9/1990 |
| JP | 06-017626 | 1/1994 |
| JP | 06-093816 | 5/1994 |
| JP | 06-272525 | 9/1994 |
| JP | 06-307219 | 11/1994 |
| JP | 07-063023 | 3/1995 |
| JP | 07-133709 | 5/1995 |
| JP | 07-293216 | 7/1995 |
| JP | 09-268907 | 10/1997 |
| JP | 11-036833 | 9/1999 |
| JP | 2000-213320 | 8/2000 |
| JP | 2001-263015 | 9/2001 |
| JP | 2002-371816 | 12/2002 |
| JP | 2003-106123 | 4/2003 |
| JP | 2003-148116 | 5/2003 |
| JP | 2003-201814 | 7/2003 |
| JP | 2003-239713 | 8/2003 |
| WO | WO 02/092972 | 11/2002 |
| WO | WO 03/098012 A1 | 11/2003 |
| WO | WO 2004/097186 A1 | 11/2004 |
| WO | WO 2005/019607 A1 | 3/2005 |
| WO | WO 2005/019609 A1 | 3/2005 |

OTHER PUBLICATIONS

International Search Report for Application No. PCT/JP03/06236.
International Search Report for Application No. PCT/JP2004/006426.
International Search Report for Application No. PCT/JP2004/006428.
International Search Report for Application No. PCT/JP2004/012191.
International Search Report for Application No. PCT/JP2004/012192.
International Search Report for Application No. PCT/JP2004/012193.
Anontaphan, Thitiphol. A study of a mechanical continuous rocker arm (VRA), SAE technical paper series 2003-01-0022, 2003 SAE World Congress Detroit, Michigan, Mar. 3-6, 2003.

* cited by examiner

VALVE DRIVE MECHANISM FOR ENGINE

PRIORITY INFORMATION

This application is based on and claims priority to Japanese Patent Application No. 2005-154325, filed May 26, 2005, the entire contents of which is hereby expressly incorporated by reference.

BACKGROUND OF THE INVENTION

1. Field of the Invention

The present invention relates to a valve drive mechanism and, more particularly, to a valve drive mechanism configured to control the open period of an intake valve or exhaust valve.

2. Description of the Related Art

Valve drive mechanisms for engines that are capable of continuously controlling the open period and lift amount of an intake or exhaust valve have been used in many practical applications. An example of such a valve drive mechanism is disclosed in German Patent No. DE 4223172 C1. This mechanism includes a rocker cam that is supported for rocking motion and is driven by a camshaft. An intake or exhaust valve is opened and closed by the rocker cam. To continuously change the open period and lift amount of the valve, the center of the rocking movement of the rocker cam is varied.

In the prior art, there is a problem in that, at the time of starting an engine by cranking, or immediately after the engine starts, unburned fuel remains in engine. This unburned fuel can be undesirably discharged or can cause unstable combustion. This, in turn, can result in an undesirable large amount of discharge of, in particular, hydrocarbons (HC).

SUMMARY OF THE INVENTION

Accordingly, an object of the present invention is to provide a valve drive mechanism for an engine that can reduce the hydrocarbon (HC) discharge amount particularly at the time when the engine starts, immediately after the engine starts, and/or in the idling operation range. It is also an object of the present invention improve fuel economy particularly in the idling operation range.

Accordingly, one aspect of the present invention comprises a valve drive mechanism for an engine that can include a drive shaft that is configured for rotation about an axis. A valve member is configured to be driven by the rotation of the drive shaft to open and close a valve. A variable valve timing mechanism is positioned at least partially between the valve member and the drive shaft. The variable valve timing mechanism is configured to vary a valve open period of the valve. The valve drive mechanism is configured such that, during a specific operation range, the valve open period includes a main valve open period during which the valve is open in a suction or exhaust stroke, and a sub valve open period during which the valve is open in an expansion or compression stroke.

Another aspect of the present invention comprises a valve drive mechanism for an engine that includes a drive shaft that is configured for rotation about an axis. A valve member is configured to be driven by the rotation of the drive shaft to open and close a valve. A variable valve mechanism positioned at least partially between the valve member and the drive shaft. The variable valve mechanism is configured to continuously vary a valve open period of the valve. The valve drive mechanism includes means for opening the valve in a suction or exhaust stroke for a first period of time and opening the valve in an expansion or compression stroke for a second period of time that is smaller than the first period of time.

Another aspect of the present invention comprises a method of operating a four-cycle internal combustion engine comprising in which during a first operating condition, the internal combustion engine is operated through a combustion cycle comprising a suction stroke, a compression stroke, an expansion stroke, and an exhaust stroke. During the combustion cycle and during the suction or the exhaust stroke. a valve is opened for a first period of time and then substantially closed. During the same combustion cycle, the same valve is opened during an expansion or compression stroke for a second period of time and then substantially closed.

Certain objects and advantages of the invention have been described above for describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF THE PREFERRED EMBODIMENTS

Figure 1:
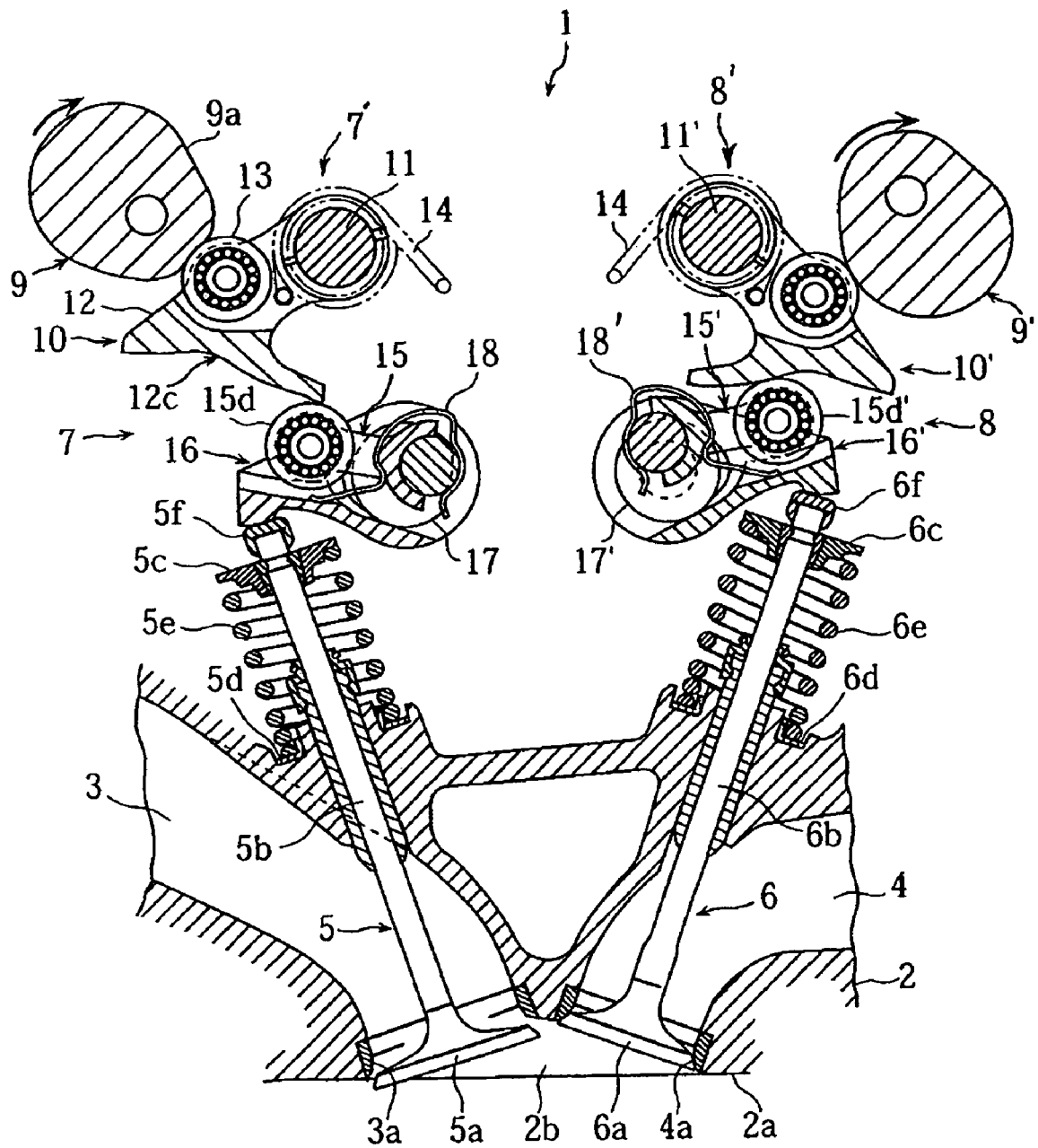
FIG. 1 is a cross-sectional side view of a first embodiment of a valve drive mechanism.
Figure 2:
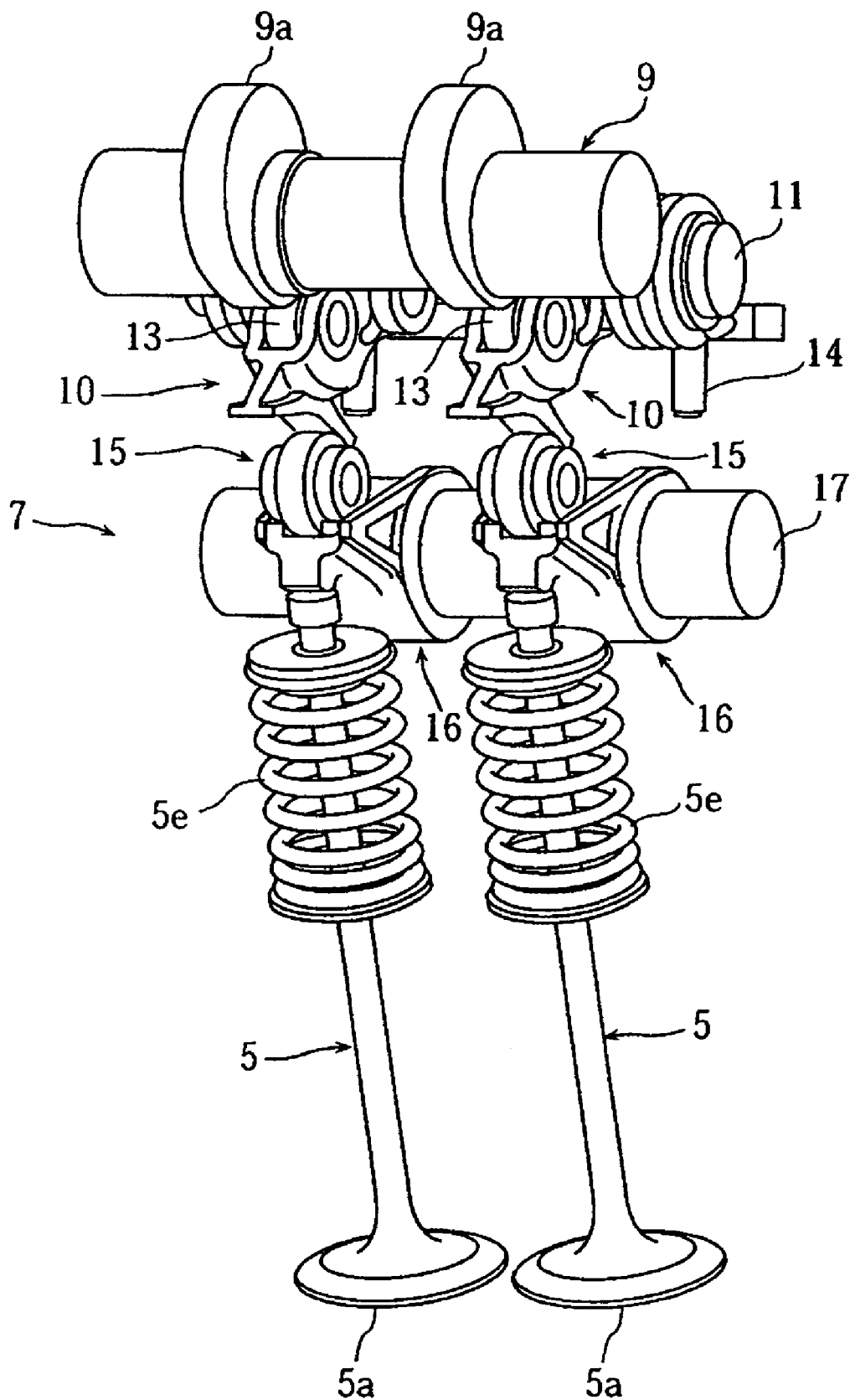
FIG. 2 is a front perspective view of the mechanism of FIG. 1.
Figure 3:
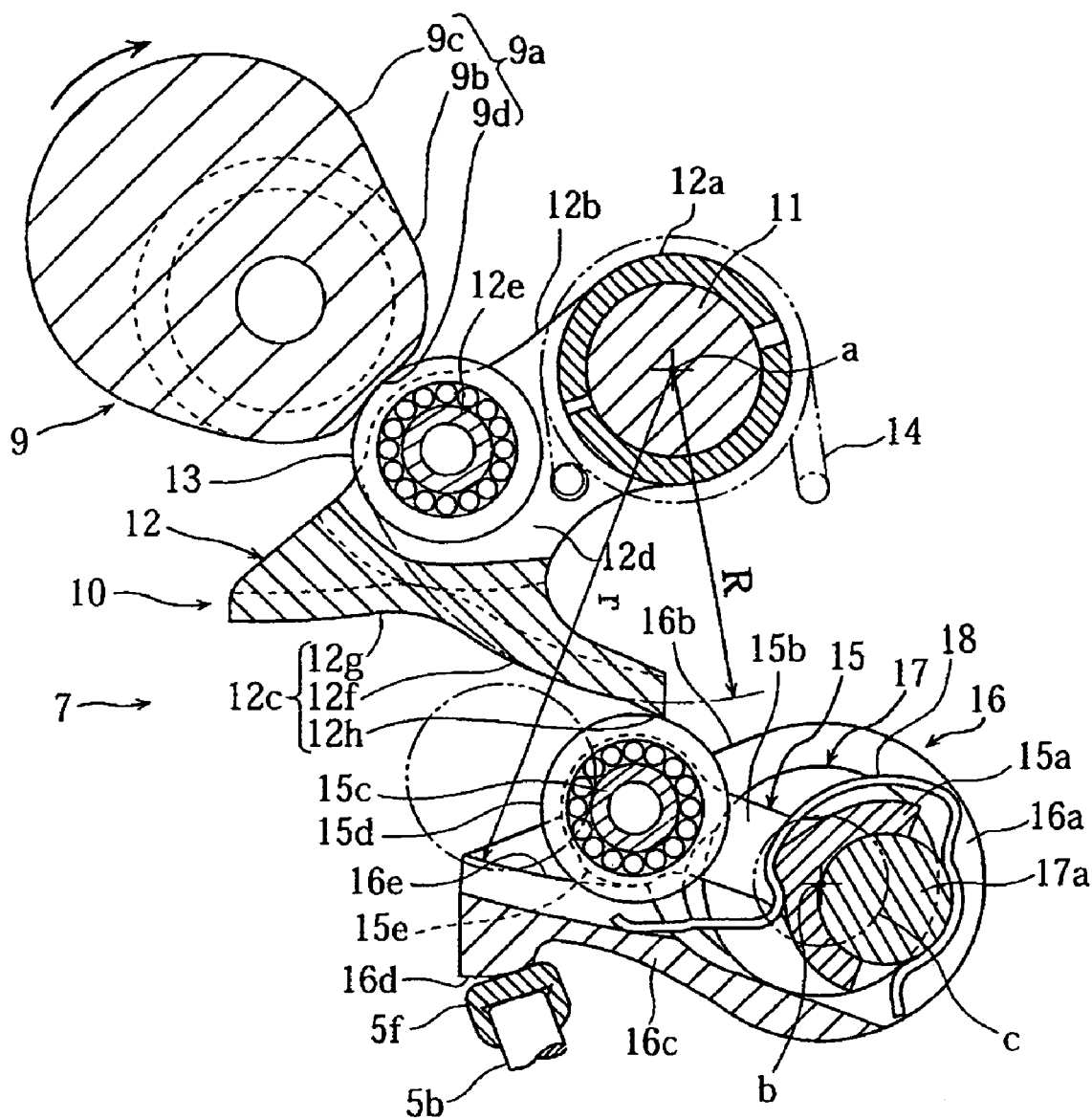
FIG. 3 is an enlarged view of an upper left portion of the valve mechanism of FIG. 1 in a first position.
Figure 4:
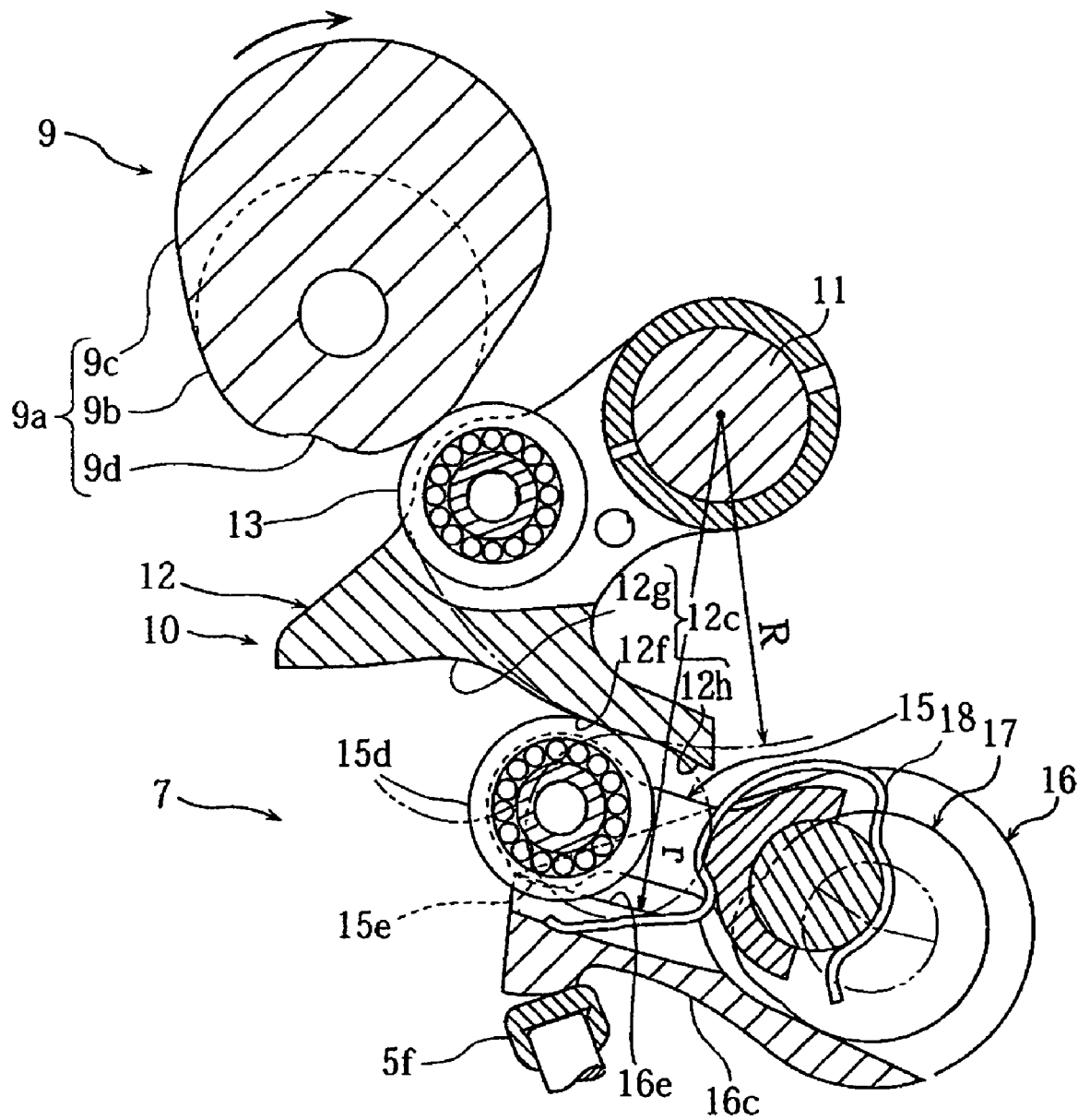
FIG. 4 is an enlarged view of an upper left portion of the valve mechanism of FIG. 1 in a second position.
Figure 5:
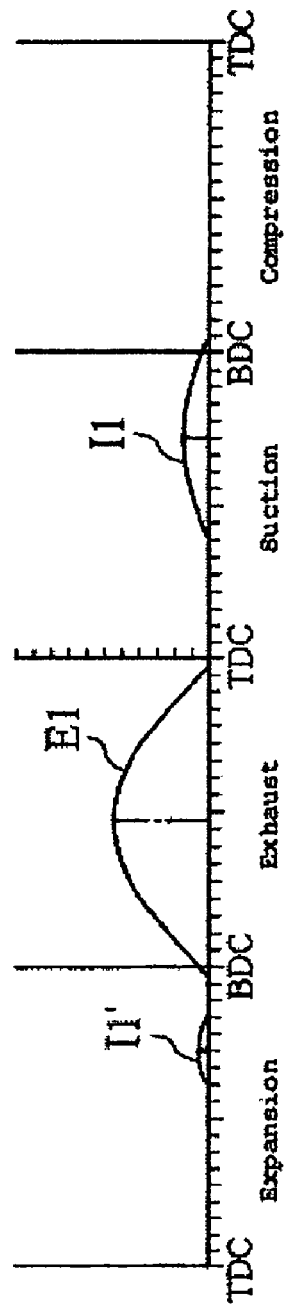
FIG. 5 illustrates a lift curve the mechanism of FIG. 1.
Figure 5:
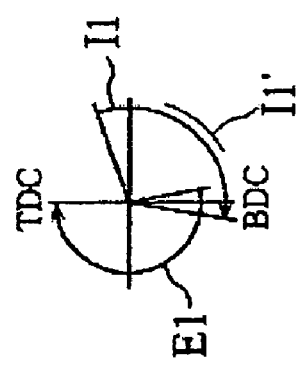
Figure 6:
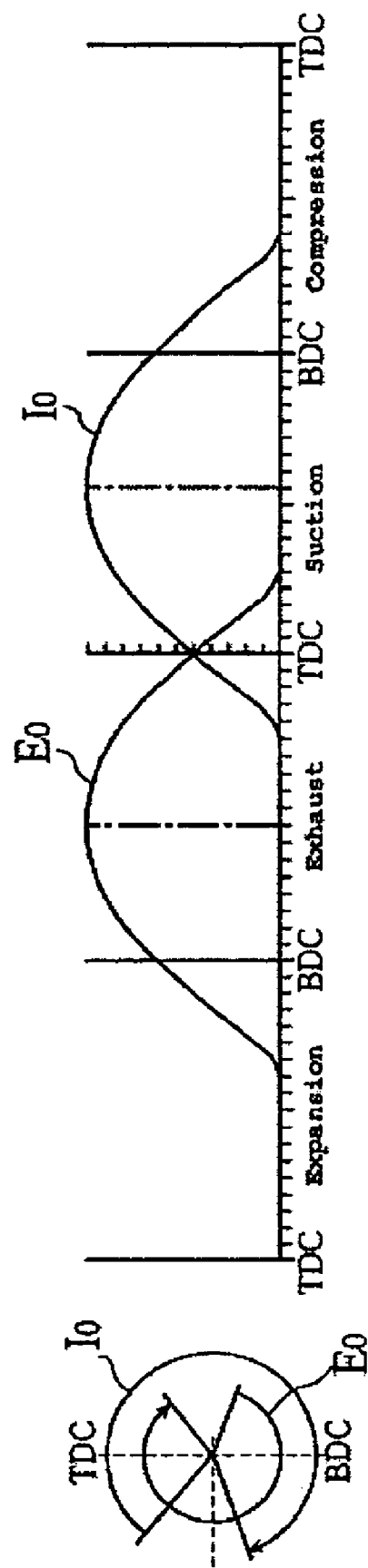
FIG. 6 illustrates another a lift curve the mechanism of FIG. 1.

FIGS. 1 to 6 show a first embodiment of a valve drive mechanism 1. FIGS. 1 and 2 are a cross-sectional side view and a front perspective view, respectively, of the valve drive mechanism 1. FIGS. 3 and 4 are enlarged views of the upper left portion of FIG. 1. FIGS. 5 and 6 show lift curves.

The first embodiment is an example an intake side valve drive mechanism that can be adapted such that the intake valve opens as usual in the suction stroke and opens slightly also in the expansion stroke in particular at the time the engine starts.

In the drawings, reference numeral 1 is used to identify a valve drive mechanism of a water-cooled, four-stroke cycle, in-line, multi-cylinder, 4-valve engine, and that will be described in detail below. A combustion recess 2b can form the cylinder head side portion of the combustion chamber and can be formed in the bottom joining face 2a portion located on the cylinder block side of the cylinder head 2. The combustion recess 2b can be provided with two intake valve openings 3a, 3a, and two exhaust valve openings 4a, 4a. The intake valve openings 3a and the exhaust valve openings 4a can each lead out through an intake port 3 and an exhaust port 4 respectively to outside connection openings. Although not shown, a catalyst can be disposed in the middle of an exhaust pipe connected to the exhaust port 4. The catalyst is activated when it reaches a specified temperature to purify hydrocarbon (HC), carbon monoxide (CO), and nitrogen oxides (NOx) by catalysis.

The illustrated water-cooled, four-stroke cycle, in-line, multi-cylinder, 4-valve engine merely exemplifies one type of engine on which various aspects and features of the valve drive mechanism embodiments described herein can be used. Engines having other numbers of cylinders and having other cylinder arrangements (V, W, opposing, etc.) also can employ various features, aspects and advantages of the described embodiments. In addition, certain aspects and features of the embodiments described herein can be extended to engines that operate on different principles (e.g., two stroke, diesel etc.).

Each intake valve opening 3a and each exhaust valve opening 4a can be opened and closed respectively with the valve head 5a of the intake valve 5 and the valve head 6a of the exhaust valve 6. The intake valve 5 and the exhaust valve 6 can be respectively urged in the closing direction by valve springs 5e and 6e that can be respectively interposed between retainers 5c, 6c. The retainers 5c, 6c can be axially immovably attached at the top end portions of valve shafts 5b, 6b and valve seats 5d, 6d can be placed on the seating face of a cylinder head 2.

An intake side valve drive mechanism 7 and an exhaust side valve drive mechanism 8 can be disposed respectively above the intake valve 5 and the exhaust valve 6. In the illustrated embodiment, the valve drive mechanisms 7, 8 are substantially the same except for some parts. Accordingly, for the sake of brevity, mainly the intake side valve drive mechanism 7 is explained below, and explanation on the exhaust side valve drive mechanism 8 will be made only for parts significantly different from those on the intake side.

The intake side valve drive mechanism 7 can generally comprise an intake camshaft (drive shaft) 9, an intake rocker arm (valve opening and closing member) 16 receiving the rotation of the intake camshaft 9 and driving the intake valve 5 to open and close, and a variable mechanism 7' interposed between the intake rocker arm 16 and the intake camshaft 9 for changing the manner of transmitting the rotation of the intake camshaft 9 to the intake rocker arm 16.

The variable mechanism 7' can also comprise an intake rocker cam 10 that can be driven with the intake cam nose 9a of the intake camshaft 9, and an intake intermediate rocker 15 that can be driven with the intake rocker cam 10. As the intake intermediate rocker 15 rocks, the intake rocker arm 16 rocks. As the intake rocker arm 16 rocks, the intake valve 5 moves back and forth in the axial direction, so that the intake valve opening 3a is opened and closed. Incidentally, the intake cam nose 9a, the intake rocker cam 10, the intake intermediate rocker 15, and the intake rocker arm 16 can be provided for every intake valve.

The intake camshaft 9 can be disposed parallel to the crankshaft (not shown) and can be supported for rotation about its axis but not to be immovable in directions normal to and along its axis, by a cam journal portion formed on the cylinder head 2 and a cam cap attached to the top joining face of the cam journal portion. The intake cam nose 9a can be formed with the intake cam noses 9a, one each for left and right intake valves 5, 5. Each intake cam nose 9a can, as shown in FIG. 3, have a base circle portion 9b of a certain outside diameter, and a main nose portion 9c of a specified cam profile for opening the intake valve 5 in the suction stroke. Further, in the approximate center of the base circle portion 9b, a sub nose portion 9d can be formed for opening the intake valve 5 by a required small opening or by only a small lift in the expansion stroke. The sub nose portion 9d can be of a shape in which part of the base circle portion 9b is formed to be an arcuately recessed portion and the recessed portion and the base circle portion are smoothly interconnected. Incidentally, the geometry of the sub nose portion 9d can be appropriately selected to produce intended valve open period and lift amount in the expansion stroke.

In the illustrated embodiment, the intake rocker arm 16 can comprise left and right arm portions 16b extending forward from ring-shaped left and right base portions 16a that can be interconnected through a bottom wall 16c to form a single member. The base portions 16a can be supported for up and down rocking motion and immovable in both the axial direction and the direction normal to the axial direction a rocker shaft (control shaft) 17 disposed parallel to the intake camshaft 9 on the cylinder head axis side.

The fore-end underside of the bottom wall 16c can be formed with a valve pressing face 16d for depressing a shim 5f attached to the top end of the intake valve 5. The inside face of each arm portion 16b can be formed with a pressed face 16e of a ledge shape to be pressed with a pressing face 15e, to be described later, of the intermediate rocker 15. The pressed face 16e can be formed, as seen in the cam axis direction when the valve is fully closed, to be an arc of radius r centered on the rocking center (a) of the intake rocker cam 10.

Part of the rocker shaft 17 between the left and right base portions 16a, 16a can be formed with an eccentric pin portion 17a smaller in diameter than other parts and displaced radially outward from the axis (b) of the rocker shaft 17. When the rocker shaft 17 is rotated, the eccentric pin portion 17a can rotate along the circle (c) about the axis (b).

A semicircular engagement base portion 15a of the intake intermediate rocker 15 can engage rotationally with the eccentric pin portion 17a. The engagement base portion 15a and the eccentric pin portion 17a can be interconnected through a plate spring 18 to be relatively rotational but inseparable from each other.

The engagement base portion 15a of the intake intermediate rocker 15 can be formed integrally with left and right arm portions 15b, 15b, extending forward. A rocker roller 15d can be provided between fore-ends of the left and right arm portions 15b, 15b. The rocker roller 15d is journaled with a roller pin 15c running in the axial direction of the rocker shaft through the left and right arm portions 15b, 15b. The front end undersides of the left and right arm portions 15b, 15b can be formed with pressing faces 15e respectively for pressing left and right pressed faces 16e of the rocker arm 16.

The rocker shaft 17 ca be configured to be rotatable to any angular position by a drive mechanism (not shown) such as a servomotor. As the angular position of the rocker shaft 17 is changed with the drive mechanism, the rocker roller 15d and the pressing face 15e of the intake intermediate rocker 15 can move along the pressed face 16e, so that the effective arm length of the rocker arm 16 and the position of the rocker arm 16 relative to the rocker cam 10 can change. Incidentally, the drive mechanism can control the angular position of the rocker shaft 17 so that the opening angle and the lift amount of the intake valve increase according to the increase, for example, in the amount of accelerator pedal depression.

The intake rocker cam 10 comprises: a rocker arm main part 12 supported for rotation but immovable in both normal to axis direction and axial direction with a rocker shaft 11 disposed parallel to the intake camshaft 9, a rocker roller 13 axially supported on the rocker arm main part 12, and a forcing spring 14 forcing the rocker arm main part 12 clockwise so that the rocker roller 13 is in constant rolling contact with the cam nose 9a.

In the illustrated embodiment, the rocker arm main part 12 can generally include a cylindrical base end portion 12a, axially supported on the rocker shaft 11 and can be formed integrally with an arm portion 12b extending forward, with the fore-end portion of the arm portion 12b formed integrally with a rocker cam face 12c. The arm portion 12b can be formed with a roller placing space 12d of a slit shape running through vertically. The rocker roller 13 can be placed in the roller placing space 12d. The rocker roller 13 can be journaled on a roller pin 12e, which runs through the arm portion 12b parallel to the rocker shaft 11.

The rocker cam face 12c can comprise a base circle portion 12f, a main lift portion 12g continuous on the fore-end side of the base circle portion 12f, and a sub lift portion 12h located on the base end side of the base circle portion 12f, with respective portions forming a continuous surface. The rocker arm main part 12 can be disposed so that the sub lift portion 12h is located on near side to the rocker shaft 17 while the main lift portion 12g on far side from the rocker shaft 17.

The base circle portion 12f can be of a semicircular shape of a radius R centered on the rocking center (a) or the axis of the rocker shaft 11. Therefore, while the base circle portion 12f is in rolling contact with the rocker roller 15d, the rocking angle of the intermediate rocker 15 and so the rocker arm 16 can remain unchanged at zero even if the rocking angle of the rocker cam 10 changes, so that the intake valve 5 is held in fully closed position without a lift.

On the other hand, the main lift portion 12g, as part of the main nose portion 9c of the intake camshaft 9 pressing the rocker roller 13 comes closer to its top portion, that is, as the rocking angle of the rocker cam 10 increases, lifts the intake valve 5 by greater amount. Incidentally, the main nose portion 9c in this embodiment is made up of: a ramp range for a constant speed, an acceleration range for varied speeds, and a deceleration range.

When the intermediate rocker 15 is located in the receded end position shown in FIGS. 1 and 3, and the intake camshaft 9 rotates from a state in which the base circle portion 9b is in rolling contact with the rocker roller 13 to a state in which the sub nose portion 9d is in rolling contact, the rocker cam 10 can be slightly rotated clockwise by the elastic force of the forcing spring 14. This results in that the sub lift portion 12h causes the rocker roller 15d and so the rocker arm 16 to rock downward according to the height of the sub lift portion 12h. As a result, the intake valve 5 can open by a small opening degree according to the height of the sub lift portion 12h.

As for the exhaust side valve drive mechanism 8, in the illustrated embodiment, unlike the intake side counterpart, a sub nose portion on the exhaust cam 9' and a sub lift portion on the rocker cam 10' are not provided.

With the valve drive mechanism 1 of this embodiment, the angular position (rotary angular amount) of the rocker shaft (control shaft) 17 can be controlled. The intermediate rocker 15 is therefore moved back and forth along the pressed face 16e, so that the open period and the lift amount of the valve are controlled.

For example in a high speed operation range as shown in FIG. 4, the angular position of the rocker shaft 17 can be controlled so that the rocker roller 15d of the intermediate rocker 15 is located at the fore-end of the rocker arm 16. As a result, the open period and the lift amount of the intake valve 5 and the exhaust valve 6 become as shown in FIG. 6: an intake side lift curve I0 and an exhaust side lift curve E0. Specifically, the intake valve 5 in the suction stroke can be open over a range for example from about 50 degrees before the top dead center to about 70 degrees after the bottom dead center, and the lift amount becomes a maximum. The exhaust valve 6 can be open over a range from about 70 degrees before the bottom dead center to about 50 degrees after the top dead center, and the lift amount becomes a maximum.

At the time the engine starts, for example for a period of about 5 seconds after cranking starts, with the exhaust side valve drive mechanism 8, the angular position of the rocker shaft 17' can be controlled so that the rocker roller 15d' is located in about the middle of the rocker arm 16'. As a result, the exhaust valve 6 can be open in the exhaust stroke as shown with the lift curve E1 in FIG. 5 over a range for example from about 10 degrees before the bottom dead center to about the top dead center, with a lift amount of about half the above-mentioned maximum.

On the other hand, with the intake side valve drive mechanism 7, at the time the engine starts, the rotary angular position of the rocker shaft 17 is controlled so that, as shown with dash-and-double-dotted line in FIG. 4, the rocker roller 15d of the intermediate rocker 15 is located at the rear end of the rocker arm 16. As a result, the rocker roller 15d is held at part of the rocker cam face 12c on the sub lift portion 12h side end for a period the base circle portion 9b of the intake camshaft 9 is in rolling contact with the rocker roller 13. Therefore, in the suction stroke, the open period and the lift amount of the intake valve 5 become as shown with an intake side lift curve I1 in FIG. 5. In other words, in the suction stroke, the intake camshaft 9 further rotates clockwise from the state shown in FIG. 4; so that the intake valve 5 is open over a range from about 70 degrees after the top dead center to about 10 degrees after the bottom dead center, with a lift amount being about one-tenth of the maximum.

As the operation goes on from the suction stroke through the compression stroke to the expansion stroke, and the intake camshaft 9 can rotate up to the position shown in FIG. 3 with its sub nose portion 9d in rolling contact with the rocker roller 13, the rocker cam 10 slightly rotates clockwise in FIG. 3 as forced by the forcing spring 14. Then, the sub lift portion 12h of the rocker cam face 12c depresses the rocker roller 15d. As a result, the rocker arm 16 slightly depresses the intake valve 5, so that the intake valve 5 opens slightly. In other words, in the expansion stroke, the intake valve 5 is open over a range as shown with a lift curve I1' in FIG. 5 from about 110 degrees after the top dead center to about 30 degrees before the bottom dead center, with its lift amount being half to one-third of that in the suction stroke.

As described above, this embodiment is configured to slightly open the intake valve 5 in the expansion stroke. Thus, a high concentration of hydrocarbon (HC) produced at the time the engine starts can be temporarily reduced. That is to say, at the time the engine starts (e.g., when cranking starts), in most cases combustion does not start or is imperfect for several initial revolutions of the engine. Therefore, there is a concern that fuel mixture almost unburned flows directly into the exhaust system. According to this embodiment, since the intake valve 5 slightly opens in the expansion stroke, at least part of the unburned gas returns to the intake port side in the exhaust stroke following the expansion stroke. Accordingly, therefore, high concentration of HC flowing toward the exhaust port in the exhaust stroke after the expansion stroke may be reduced. The unburned gas returned to the intake port side is suctioned again into the combustion chamber together with mixture in the following intake stroke and burned. As a result, it is possible to reduce the discharged amount of high concentration of HC.

Figure 7:
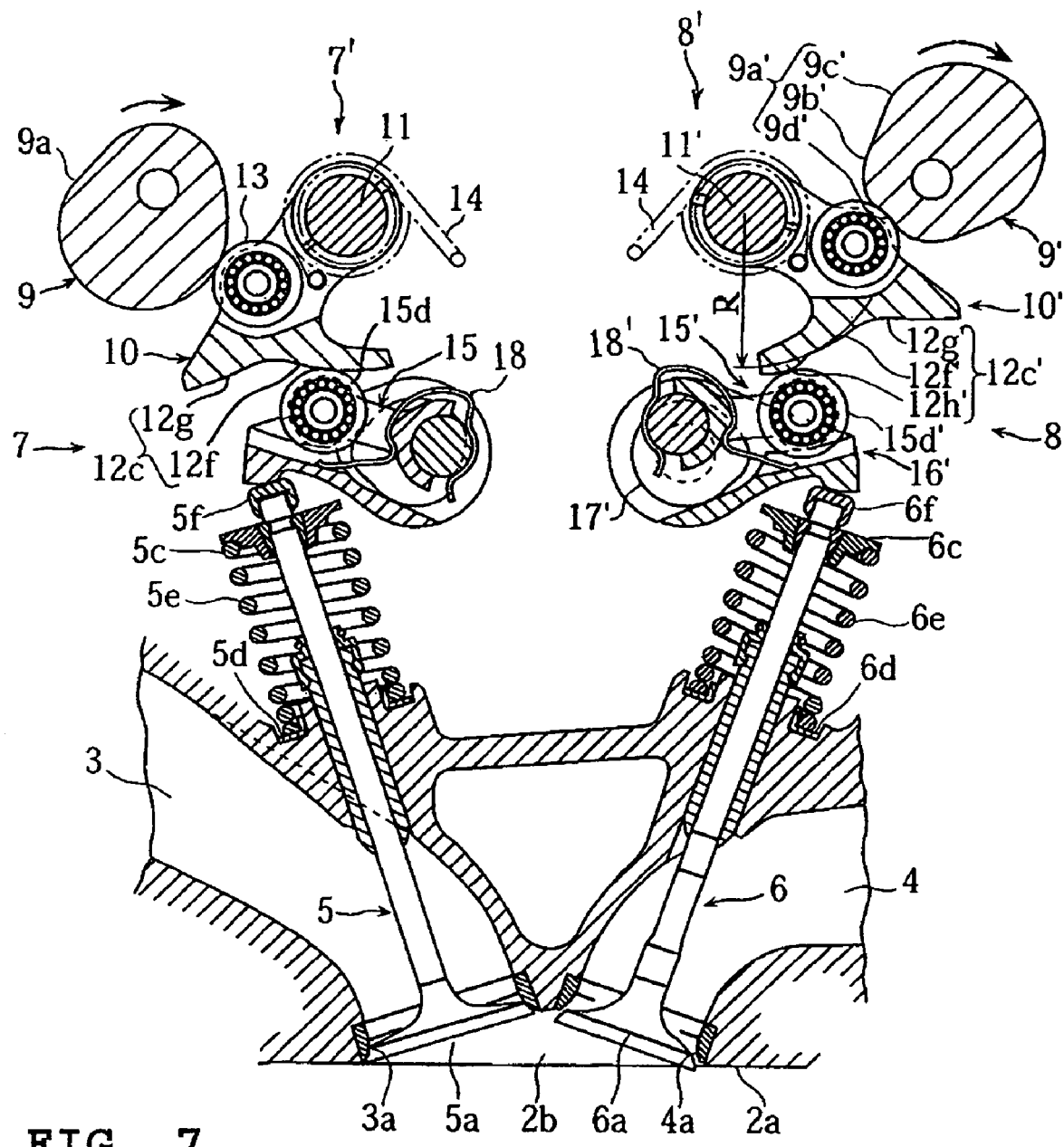
FIG. 7 is a cross-sectional side view of a second embodiment of a valve drive mechanism.
Figure 8:
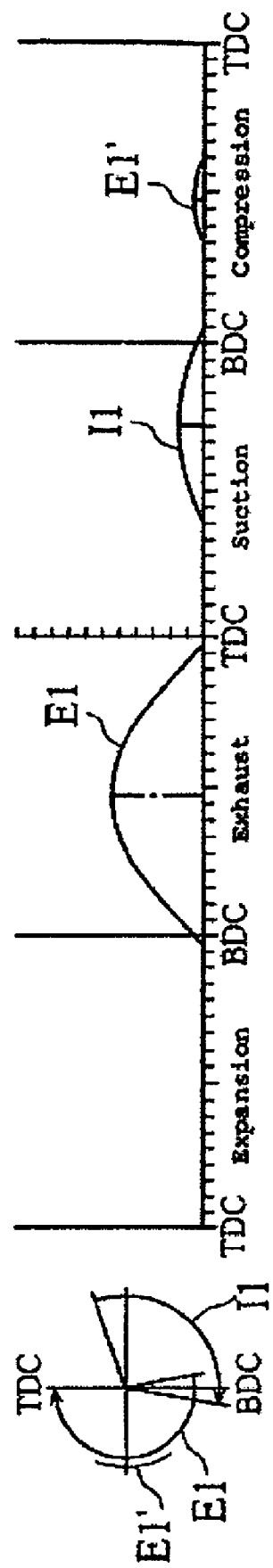
FIG. 8 illustrates a lift curve of the mechanism of FIG. 7.

FIGS. 7 and 8 illustrate a second embodiment of a valve drive mechanism. In these drawings, the same reference numerals and symbols denote the same or like parts as those in FIGS. 1 to 6.

While certain features configured to reduce HC in the exhaust were applied to the intake side valve drive mechanism in the first embodiment; in the second embodiment, certain features configured to reduce HC in the exhaust are applied to the exhaust side valve drive mechanism. For example, the embodiment below is adapted such that the exhaust valve can open as usual in the exhaust stroke and can open slightly also in the compression stroke in particular for a short period of time immediately after the engine starts.

With reference to FIG. 7, In the exhaust side valve drive mechanism 8 of the second embodiment, the exhaust cam nose 9a' of the exhaust camshaft 9' can comprise a base circle portion 9b', a main nose portion 9c', and a sub nose portion 9d'. The rocker cam face 12c' of the exhaust rocker cam 10' can comprises a base circle portion 12f', a main lift portion 12g', and a sub lift portion 12h'.

In the intake side valve drive mechanism 7, the rocker cam face 12c can have the base circle portion 12f, and the main lift portion 12g, but not the sub lift portion 12h provided in the first embodiment.

The valve drive mechanism of the second embodiment can be controlled as described below for a period of time from the engine start to immediately thereafter, more specifically for example for about 60 seconds after the end of engine cranking. With the intake side valve drive mechanism 7, the rocker shaft 17 can be controlled to be in the same position as in the first embodiment. Therefore, the open period and the lift amount of the intake valve 5 in the suction stroke become the same as that in the first embodiment as shown with the lift curve I1 in FIG. 8. Incidentally, the intake valve 5 does not open in the expansion stroke.

On the other hand, in the exhaust side valve drive mechanism 8; the rocker shaft 17' can be controlled to be in the same angular position as in the first embodiment. Therefore, the exhaust valve 6 in the exhaust stroke follows the same lift curve E1 as that in the first embodiment as shown in FIG. 8. On the other hand, as the operation goes on from the exhaust stroke through the suction stroke to the compression stroke, the sub nose portion 9d' of the exhaust camshaft 9' comes into rolling contact with the rocker roller 13. As a result, the exhaust rocker cam 10' slightly rotates counterclockwise as forced by the forcing spring 14. The sub lift portion 12h' can depress the rocker arm 16' through the rocker roller 15d' located on the exhaust side. Accordingly, the exhaust valve 6 opens slightly. As a result, the open period and the lift amount of the exhaust valve 6 in the compression stroke follow the lift curve E1' as shown in FIG. 8. Specifically, the exhaust valve 6 in the compression stroke is open for a range from about 60 degrees after the bottom dead center to about 70 degrees before the top dead center.

Since the second embodiment is adapted that the exhaust valve 6 opens slightly in the compression stroke, it is possible to activate catalyst quickly within a short period of time immediately after the engine starts and in particular removing, by catalyst, HC flowing into the exhaust system.

In other words, since the exhaust valve 6 slightly opens in the compression stroke immediately after the engine starts, part of the mixture introduced into the combustion chamber flows into the exhaust port and is burned there. This burning can rapidly heat up and activate the catalyst disposed in the exhaust system. As a result, it is possible to securely purify HC flowing into the exhaust system in particular during a period immediately after the engine starts when combustion is not stabilized yet. In a modified embodiment, for a fuel injected engine, the timing of the fuel injection can be adjusted to along with the opening of the exhaust valve 6 during the compression stroke and/or the timing of the opening of the exhaust valve 6 can be adjusted given the timing of the fuel injection with respect to TDC.

Figure 9:
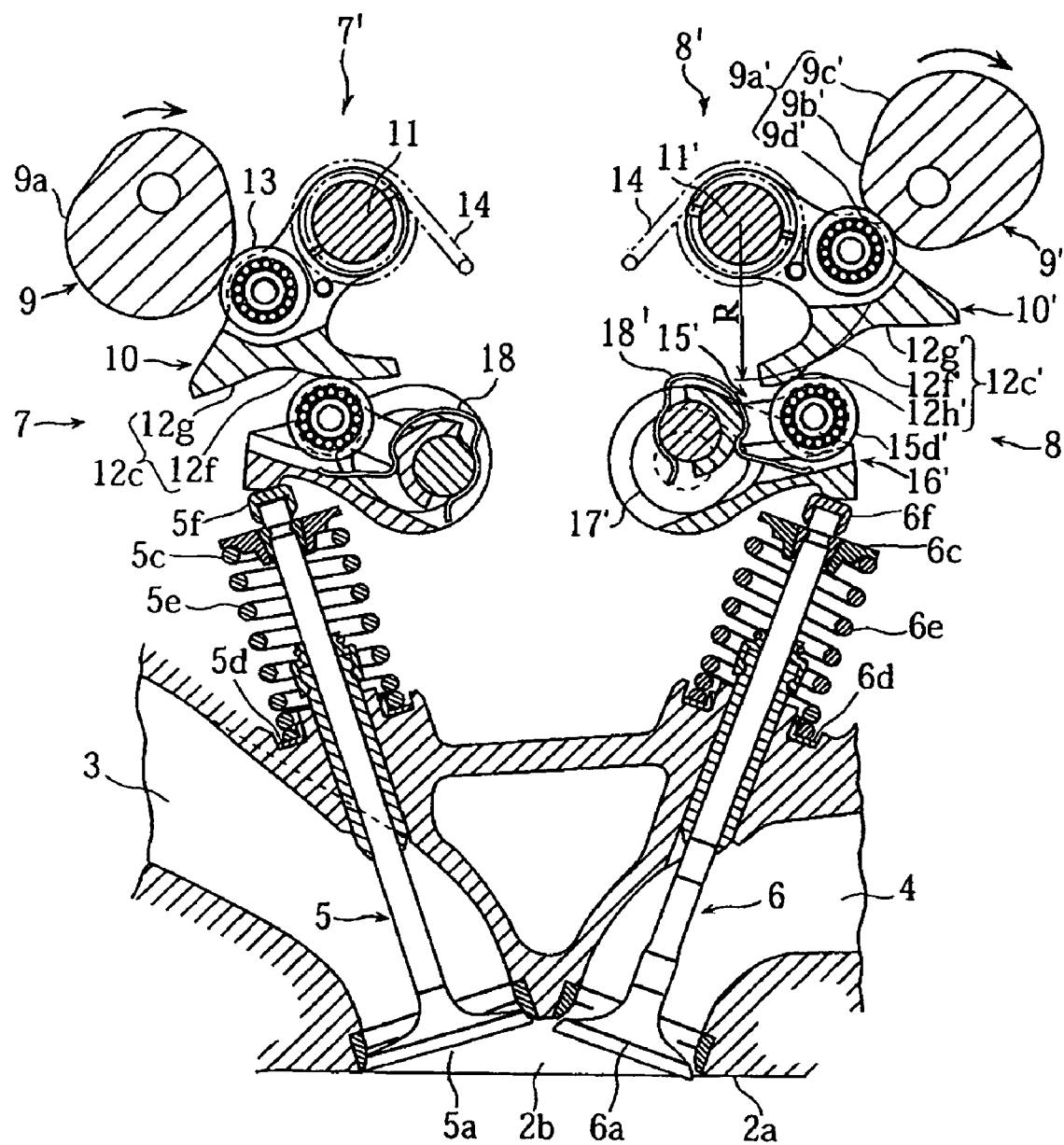
FIG. 9 is a cross-sectional side view of a third embodiment of a valve drive mechanism.
Figure 10:
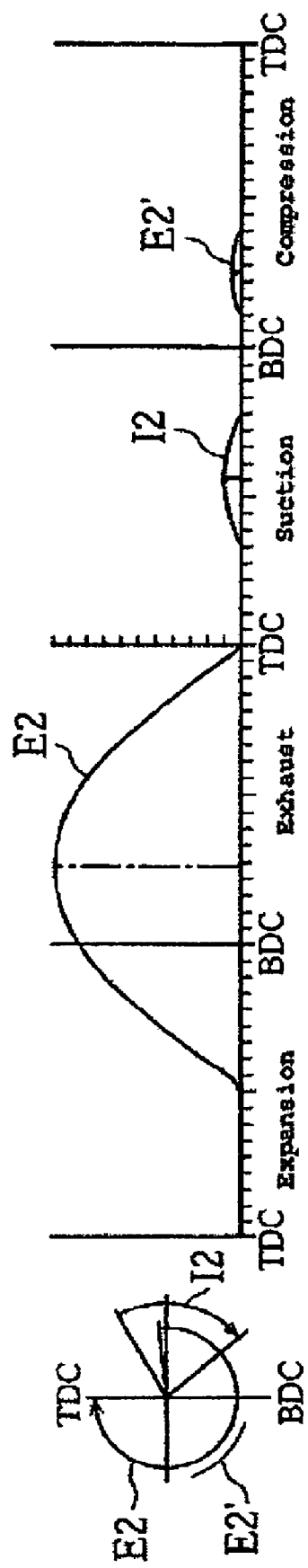
FIG. 10 illustrates a lift curve the mechanism of FIG. 9.

FIGS. 9 and 10 illustrate a third embodiment of a valve drive mechanism. In the drawings, the same reference numerals and symbols denote the same or like parts as those in FIGS. 1 to 8.

While the second embodiment described can be adapted such that that the exhaust valve slightly opens also in the compression stroke during a short period of time immediately after the engine starts, the third embodiment is an example that can be adapted such that the that the exhaust valve slightly opens during idling.

With reference to FIG. 10, The valve drive mechanism 8 in the third embodiment can be adapted like the second embodiment in that the exhaust cam nose 9a' of the exhaust camshaft 9' can have a base circle portion 9b', a main nose portion 9c', and a sub nose portion 9d'. The rocker cam face 12c' of the exhaust rocker cam 10' can have a base circle portion 12f', a main lift portion 12g', and a sub lift portion 12h.'

In the intake side valve drive mechanism 7, the rocker cam face 12c can have the base circle portion 12f, and the main lift portion 12g, but not the sub lift portion 12h provided in the first embodiment.

The valve drive mechanism of the third embodiment can be controlled during idling operation as described below. In the intake side valve drive mechanism 7, the rocker shaft 17 can be controlled so that the rocker roller 15d recedes further than in the second embodiment. Therefore, the open period and the lift amount in the suction stroke of the intake valve 5 become as shown with the lift curve I2 in FIG. 10, still smaller than that in the second embodiment. Incidentally, the intake valve 5 does not open in the expansion stroke in the illustrated embodiment.

On the other hand, in the exhaust side valve drive mechanism 8, the rocker shaft 17' is controlled so that the rocker roller 15d moves further forward than in the second embodiment. Therefore, the exhaust valve 6 in the exhaust stroke follows the lift curve E2 (FIG. 10) which is the same in both open period and lift amount as the lift curve E0 but slightly advanced in angle. On the other hand, as the operation goes from the exhaust stroke through the suction stroke and to the compression stroke, the sub nose portion 9d' of the exhaust camshaft 9' comes into rolling contact with the rocker roller 13. Accordingly, the exhaust rocker cam 10' slightly rotates counterclockwise due to elastic force of the forcing spring 14. As a result, the sub lift portion 12h' depresses the rocker arm 16' through the rocker roller 15d' located on the exhaust side. This results in that the exhaust valve 6 opens slightly. As a result, the open period and the lift amount of the exhaust valve 6 in the compression stroke become as shown with the lift curve E2' in FIG. 10. In specific terms, in the compression stroke, the exhaust valve 6 is open during a period of time from about 15 degrees after the bottom dead center to about 65 degrees after the bottom dead center.

As described above, since the third embodiment can be adapted that the exhaust valve 6 opens slightly in the compression stroke, it is possible in the idling operation to improve fuel economy, stabilize combustion, and purify by catalysis.

For fuel economy and stabilized combustion in idling operation, the intake valve opening can be made minimum and the ignition timing is advanced. There is a problem, however, that the catalyst is undesirably cooled because of decrease in the heat amount flowing into the exhaust system, resulting in unsatisfactory exhaust gas purification. Therefore, there is inevitably a limit to improvement in fuel economy by reducing the intake valve opening.

Since the third embodiment is adapted such that the exhaust valve opens slightly in the compression stroke, part of mixture is pushed out into the exhaust pipe and burned there. As a result, it is possible to avoid decrease in catalyst temperature and maintain purification by catalysis.

Here, it is conceivable to maintain the catalyst temperature by increasing the amount of mixture fed to the combustion chamber. In that case, however, it is concerned that most of the increased amount of mixture is used for heating up the combustion chamber that is cooled with cooling water, and heating up the catalyst in the exhaust pipe is very inefficient, ending up in poor fuel economy.

Since the third embodiment is adapted as described above such that part of mixture is pushed into the exhaust pipe and is burned there, the energy of burned mixture can be directly used to heat up the catalyst with high efficiency, resulting in improved fuel economy.

Incidentally, it is also in modified embodiments to combine any two or three of the first to third embodiments. That is to say, for example, the intake valve can open slightly in the expansion stroke at the time the engine starts and the exhaust valve can open slightly in the compression stroke immediately after the engine starts, or further that the exhaust valve can open slightly in the compression stroke also during idling. In this way, it is possible to provide the effects of the first to third embodiments simultaneously.

The first to third embodiments are described above for the case in which the drive shaft is used as a drive source for opening and closing the valves is the camshaft. However, modified embodiments can be applied to the case in which the drive shaft is a crankshaft as shown in the fourth embodiment in FIGS. 11 and 12. In these drawings, the same reference numerals and symbols denote the same or like parts as those in FIG. 1.

As mentioned above, the first to third embodiments described can be adapted that the camshaft 9 has the function of rocking the rocker cam 10 toward the valve opening side only, and the forcing spring 14 is used to rock the rocker cam 10 toward the valve closing side.

In contrast to the above, the fourth embodiment can use the crankshaft 90 in place of the camshaft 9. The crankshaft 90 can comprises a shaft main part 90a, a pair of disk-shaped crank arm portions 90b, 90b that can be formed integral with and greater in diameter than the shaft main part 90a, and a crankpin 90c formed between the crank arm portions 90b, 90b as displaced from the axis of the shaft main part 90a. The crankshaft 90 can be connected through a connecting rod 91 to the arm main part 12 of the rocker cam 10. One end 91a of the connecting rod 91 can be connected to the crankpin 90c while the other end 91b is connected through the connection pin 91c to the arm main part 12. Incidentally, in the fourth embodiment, the forcing spring 14 used in the first to third embodiments is not required.

Figure 11:
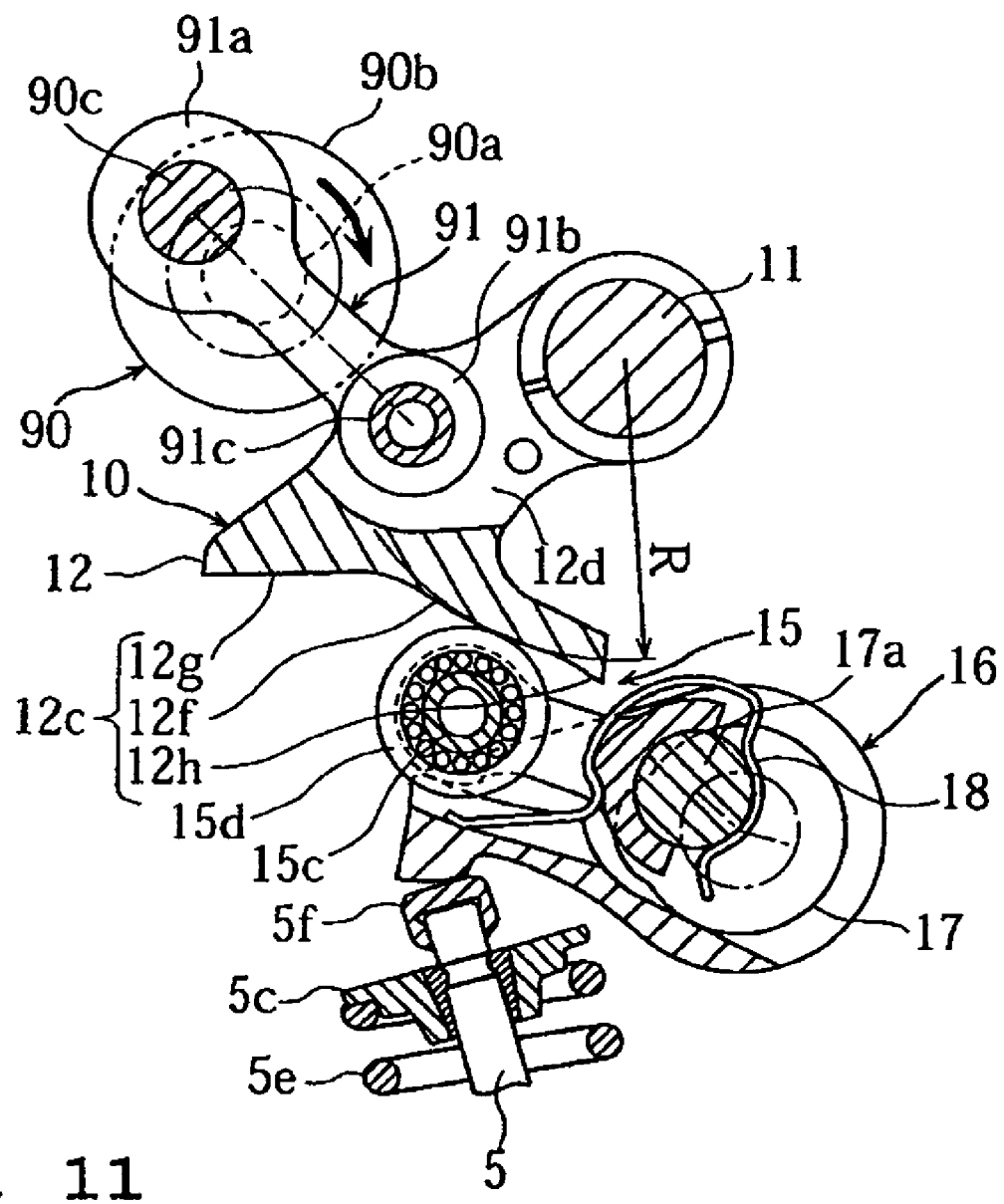
FIG. 11 is a cross-sectional side view of a fourth embodiment of a valve drive mechanism shown in a first position.

In this embodiment, the rocker cam 10 can be forcibly driven in both valve opening and closing directions along with the rotation of the crankshaft 90. For example in high speed and high load operation range, the angular position of the rocker shaft 17 can be controlled as shown in FIG. 11, so that the rocker roller 15d of the intermediate rocker 15 comes to the fore-end of the rocker arm 16. This can maximize the open period and the lift amount of the intake valve 5.

Figure 12:
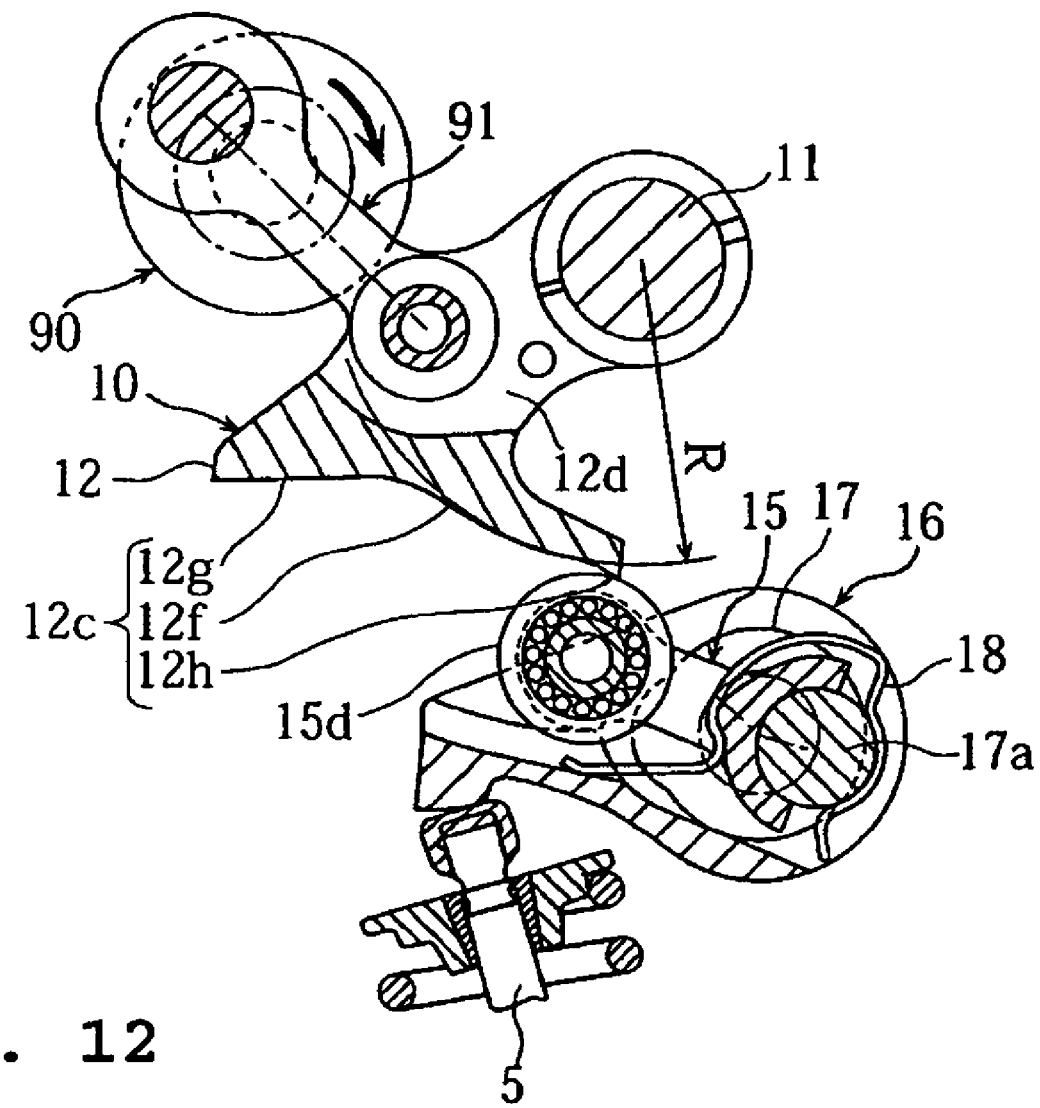
FIG. 12 is a cross-sectional side view of the mechanism of FIG. 11 shown in a second position.

At the time the engine starts, for example during a period of about 5 seconds from the start of cranking, as shown in FIG. 12, the angular position of the rocker shaft 17 is controlled so that the rocker roller 15d of the intermediate rocker 15 comes to the rear end of the rocker arm 16. When the operation goes to the expansion stroke in this state, the sub lift portion 12h of the rocker cam face 12c of the rocker cam 10 can depress the rocker roller 15d, to thereby slightly depresses the intake valve 5 to open slightly (See e.g., the lift curve I1' in FIG. 5).

Since this embodiment can be adapted as described above that the rocker cam 10 is forced to rock in both opening and closing directions by the crankshaft 90, it is possible to securely depress the rocker arm 16 by the sub lift portion 12h, and accordingly to open the intake valve 5 securely.

The first to fourth embodiments described above are examples in which the valve drive mechanism can comprises the camshaft or crankshaft, the rocker cam driven with the camshaft or crankshaft, the intermediate rocker driven with the rocker cam, and the rocker arm rocking together with the intermediate rocker. However, the valve drive mechanisms to which the invention may be applied are not limited to those in the above embodiments. Rather, the present invention may also be applied for example to the valve drive mechanisms shown in FIGS. 13 to 15.

Figure 13:
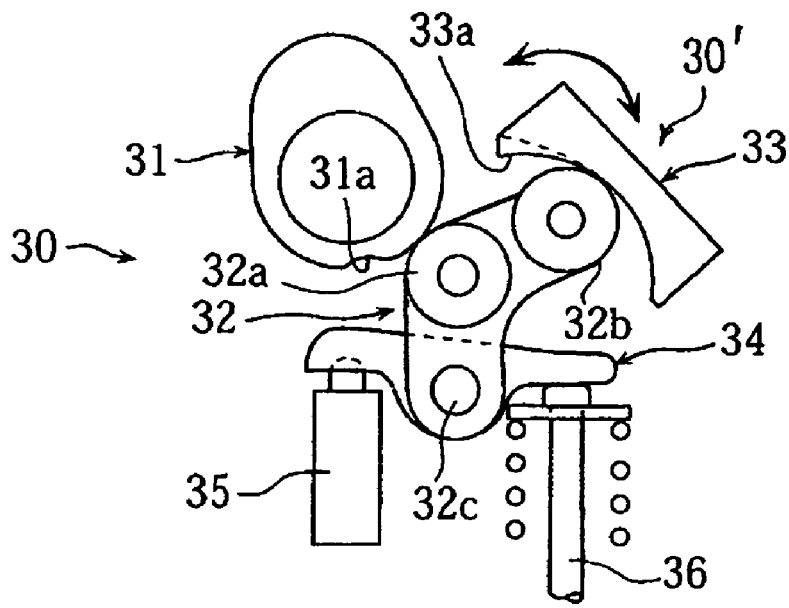
FIG. 13 is a schematic side view of a fifth embodiment of valve drive mechanism.

In a fifth embodiment shown in FIG. 13, the valve drive mechanism 30 comprises a variable mechanism 30' interposed between the intake camshaft 31 and the rocker arm 34. The variable mechanism 30' comprises: a rocker lever 32 with its center roller 32a driven with the camshaft 31, and a guide cam 33 for guiding a roller 32b located at one end of the rocker lever 32. The other end 32c of the rocker lever 32 is connected to the rocker arm 34. Besides, one end of the rocker arm 34 can be supported with a lash adjuster 35 while the other end is adapted to depress the top end of the intake valve 36.

With the above valve drive mechanism 30, the position where the roller 32b of the rocker lever 32 contacts the guide cam 33 can change as the guide cam 33 is rocked in the direction indicated with an arrow in the drawing, so that the open period and the lift amount of the intake valve 36 changes.

In the fifth embodiment, the base circle portion of the cam nose of the intake camshaft 31 can be formed with a sub nose portion 31a corresponding to the sub nose portion 9d in the first to third embodiments. Besides, one end of the guide cam 33 can be formed with a raised sub lift portion 33a corresponding to the sub lift portion 12h in the first to third embodiments. As a matter of course, it is also possible to provide the sub nose portion and the sub lift portion on the exhaust valve side.

Also with this embodiment, the intake valve 36 cam open as usual in the suction stroke and opens slightly also in the expansion stroke. In this way, the same effects as with the first to third embodiments can be provided.

Figure 14:
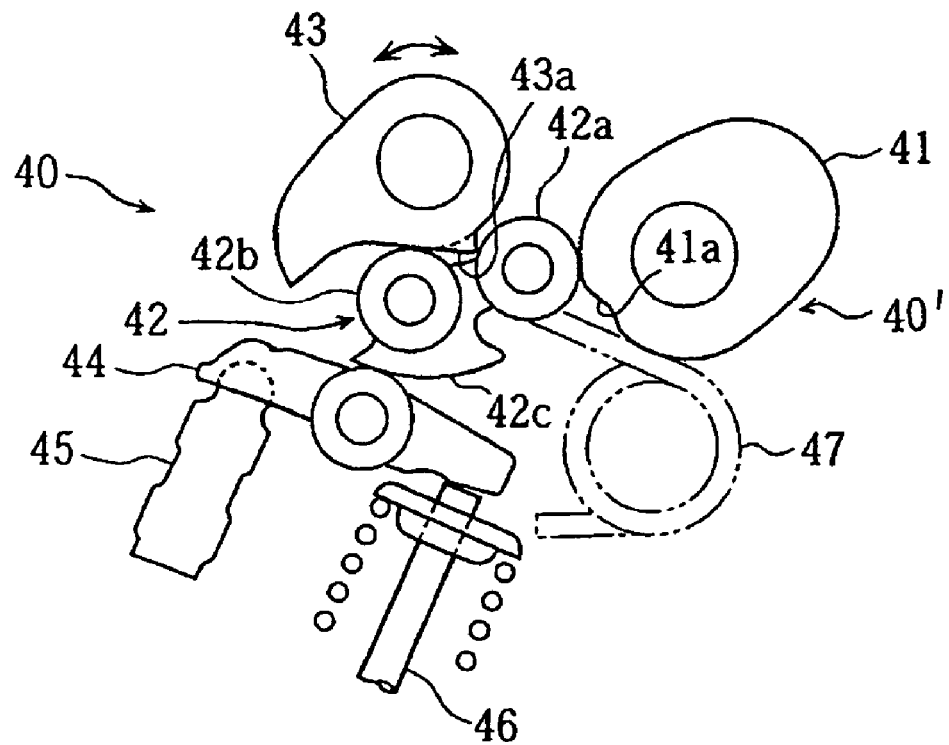
FIG. 14 is a schematic side view of a sixth embodiment of valve drive mechanism.

In a sixth embodiment shown in FIG. 14, the variable mechanism 40' of the valve drive mechanism 40 can comprise a rocker lever 42 having a roller 42a located at one end thereof and rocked with the intake camshaft 41, and a guide cam 43 for guiding a roller 42b located in the center of the rocker lever 42. A rocker arm 44 can be depressed with a cam face 42c located at the other end of the rocker lever 42. Besides, one end of the rocker arm 44 is supported with a lash adjuster 45 while the other end is adapted to depress the top end of the intake valve 46. Reference numeral 47 denotes a forcing spring that forces the rocker lever 42 against the guide cam 43.

In the valve drive mechanism 40, the position where the roller 42b of the rocker lever 42 contacts the guide cam 44 changes as the guide cam 43 is rocked in the direction indicated with an arrow in the drawing, so that the open period and the lift amount of the intake valve 46 changes.

In the sixth embodiment, the base circle portion of the cam nose of the intake camshaft 41 is formed with a sub nose portion 41a corresponding to the sub nose portion 9d in the first to third embodiments. Besides, one end of the cam face of the guide cam 43 is formed with a raised sub lift portion 43a corresponding to the sub lift portion 12h in the first to third embodiments. As a matter of course, it is also possible to provide the sub nose portion and the sub lift portion on the exhaust valve side.

Also in the sixth embodiment, the intake valve 46 opens as usual in the suction stroke and opens slightly also in the expansion stroke. In this way, the same effects as with the first to third embodiments can be provided.

Figure 15:
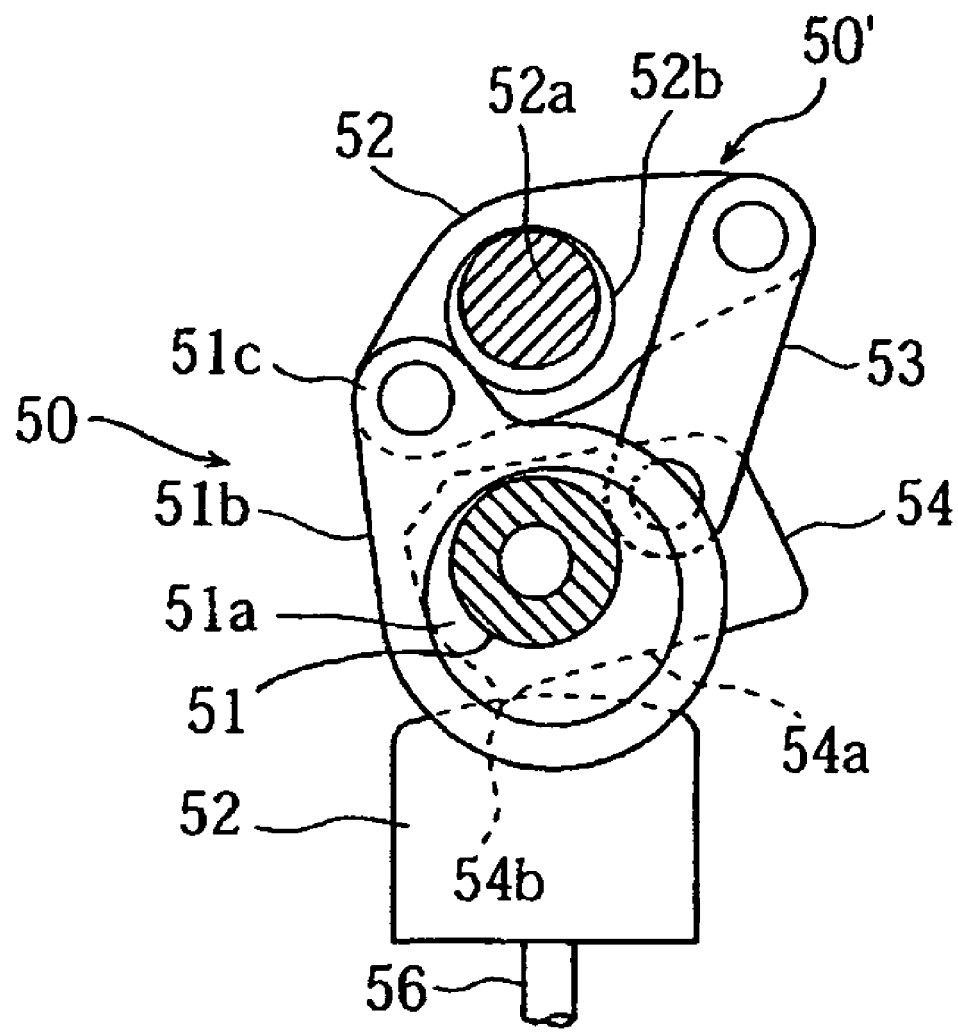
FIG. 15 is a schematic side view of a seventh embodiment of the mechanism.

In the valve drive mechanism 50 shown as a seventh embodiment in FIG. 15, a variable mechanism 50' is interposed between a drive shaft 51 serving as a drive source, and a lifter 52 serving as a valve opening and closing member.

The drive shaft 51 can be integrally formed with an eccentric portion 51a to support the base portion of a link arm 51b for relative rotation. As the drive shaft 51 is driven to rotate by the engine rotation, the fore-end portion 51c of the link arm 51b moves up and down, as seen in the drawing, along with the rotation of the eccentric portion 51a.

The variable mechanism 50' can comprise a rocker link 52 with its one end connected to the fore-end 51c of the link arm 51b, and a rocker cam 54 connected through a link plate 53 to the other end of the rocker link 52. Along with the rotation of the eccentric portion 51a, the rocker link 52 can make rocking motion which is transmitted through the link plate 53 to the rocker cam 54. The rocking motion of the rocker cam 54 drives the lifter 52 to move up and down, which in turn causes the intake valve 56 to open and close.

The rocker link 52 can be supported for relative rotation by the eccentric cam portion 52b of the eccentric shaft 52a. Therefore, the center of rocking motion of the rocker link 52 can change with the rotation of the eccentric shaft 52a. As a result, manner of transmitting the rotation of the drive shaft 51 to the lifter 52 changes, so that the open period and the lift amount of the intake valve 56 changes.

In the seventh embodiment, the cam face 54a of the rocker cam 54 is formed with a sub lift portion 54b corresponding to the sub lift portion 12h in the fourth embodiment described before.

In seventh embodiment, the rocker cam 54 is forcibly driven in both valve opening and closing directions along with the rotation of the drive shaft 51, so that the intake valve is opened and closed securely.

Also in this embodiment, the intake valve 56 opens normally in the suction stroke and opens slightly also in the expansion stroke. In this way, the same effects as with the first to fourth embodiments are provided.

In some of the embodiments described above, the valve open period is set to have: the main valve open period in which the valve is open in the intake or exhaust stroke, and the sub valve open period in which the valve is open in expansion or compression stroke during specific operation range. This results in that, during the sub valve open period in the expansion stroke, outflow of part of combustion gas or unburned gas into the intake system is allowed and, during the sub valve open period in the compression stroke, outflow of part of mixture into the exhaust system is allowed. This can make it possible to securely reduce HC outflow into the exhaust system and carry out purification of exhaust gas more securely using catalyst by activating the catalyst disposed in the exhaust system within a short period of time.

In certain embodiments, described above, the intake valve open period can at the time the engine starts be set to be the sub intake valve open period in which the intake valve is open in the expansion stroke. This can result in that outflow of part of combustion gas or unburned gas into the intake system is allowed in the sub intake valve open period. As a result, it is possible to temporarily reduce high concentration of HC produced at the time the engine starts.

In other words, at the time the engine starts (at the time cranking is started), combustion often does not take place for initial several revolutions of the engine, or results in imperfect combustion. Therefore, there is a risk that a part of fuel mixture remains unburned and is discharged directly to the exhaust system. According to these embodiments, since the intake valve slightly opens in the expansion stroke, at least part of the unburned gas results in returning to the intake port side. Therefore, it is possible to accordingly reduce high concentration of HC flowing out toward the intake port in the exhaust stroke following the expansion stroke. In addition, the unburned gas returned to the intake port side is suctioned again into the combustion chamber together with mixture in the following intake stroke and burned. As a result, it is possible to reduce the discharged amount of high concentration HC for several cycles immediately after starting the engine.

In other embodiments, the valve mechanism is adapted such that the exhaust valve is slightly open in the compression stroke. In such embodiments, it is possible to activate catalyst more quickly within a short period of time immediately after the engine starts, and in particular to purify HC flowing into the exhaust system by a catalyst.

In other words, since the exhaust valve opens slightly in the compression stroke immediately after the engine starts, part of the mixture led into the combustion chamber results in flowing into the exhaust port and burning in the exhaust system. This burning causes the catalyst disposed in the exhaust system to heat up quickly and become activated. As a result, it is possible to securely purify HC flowing into the exhaust system in particular during the period immediately after the engine starts when combustion is not stabilized yet.

The valve drive mechanism can also be adapted such that the intake valve opens slightly in the expansion stroke at the time the engine starts and that the exhaust valve opens slightly in the compression stroke immediately after the engine starts. Therefore, outflow of unburned gas into the exhaust system is restricted at the time the engine starts, and part of mixture is burned in the exhaust system immediately after the engine starts, so that the catalyst is quickly heated up and activated. As a result, it is possible to further restrict outward discharge of HC.

In another embodiment, the valve drive mechanism can be adapted such that the exhaust valve opens slightly in the compression stroke in the idling operation range. In this embodiment, it is possible to improve fuel economy, and stabilize and purify combustion by a catalyst in the idling operation range.

In such an embodiment, in the idling operation, the intake valve opening can be made minimum and ignition timing can be advanced for fuel economy and combustion stability. There can be a problem, however, in that the catalyst is undesirably cooled because of decrease in the heat amount flowing into the exhaust system, causing hindrance in exhaust gas purification. Since this embodiment can be adapted that the exhaust valve opens slightly in the compression stroke in the idling operation range, part of mixture can be pushed into the exhaust pipe and burned in there. Therefore, it is possible to avoid catalyst temperature from decreasing and maintain purification using the catalyst.

With this embodiment, the combustion energy of the mixture flowing into the exhaust pipe can be used directly for heating up the catalyst efficiently. This results in improved fuel economy.

According to another embodiment described above, the cam face of the rocker cam comprising the variable mechanism can have the sub lift portion formed on the base end side of the base circle portion, and the cam nose portion of the intake camshaft can have the sub nose portion for driving the intermediate rocker in the opening direction using the sub lift portion of the cam face. This makes it possible to bring about the sub intake valve open period for the intake valve in the expansion stroke with a simple constitution, so that the amount of HC flowing into the exhaust system is reduced.

According to another embodiment described above, the cam face of the rocker cam comprising the variable mechanism can have the sub lift portion formed on the base end side of the base circle portion, and the cam nose portion of the exhaust camshaft has the sub nose portion for driving the intermediate rocker in the opening direction using the sub lift portion of the cam face. This makes it possible to bring about the sub intake valve open period for the exhaust valve in the compression stroke with a simple constitution, and as a result to bring about speedy activation of the catalyst and securely purify HC discharge.

According to another embodiment described above the valve drive mechanism can be adapted such that the intake side variable mechanism causes the intake valve to open slightly in the expansion stroke and that the exhaust side variable mechanism causes the exhaust valve to open slightly in the compression stroke. Therefore, outflow of unburned gas into the exhaust system is restricted at the time the engine starts, and part of mixture is burned in the exhaust system immediately after the engine starts, so that the catalyst is heated up and activated quickly. As a result, it is possible to further restrict outward discharge of HC.

Certain objects and advantages of the invention have been described above for describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations and/or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A valve drive mechanism for an engine, the valve drive mechanism comprising:
   a drive shaft that is configured for rotation about an axis;
   a valve member that is configured to be driven by the rotation of the drive shaft to open and close a valve; and
   a variable valve mechanism positioned at least partially between the valve member and the drive shaft, the variable valve mechanism configured to vary a valve open period of the valve;
   wherein the variable valve mechanism is configured such that, during a specific operation range, the valve open period includes a main valve open period during which the valve is open in a suction or exhaust stroke, and a sub valve open period during which the valve is open in an expansion or compression stroke;
   wherein the variable valve mechanism comprises a rocker cam having a main lift portion on one end and a sub lift portion on an opposite end, the main lift portion configured to engage the valve member during the main valve open period, and the sub lift portion configured to engage the valve member during the sub valve open period.

2. The valve drive mechanism of claim 1, wherein the valve is an intake valve.

3. The valve drive mechanism of claim 2, wherein the specific operation range corresponds to when the engine is starting and wherein during the main valve open period the intake valve is open in the suction stroke and during the sub valve open period the intake valve is open in the expansion stroke.

4. The valve drive mechanism of claim 3, wherein during the sub valve open period combustion gas or unburned gas flows into an intake system during the expansion stroke.

5. The valve drive mechanism of claim 1, wherein the valve is an exhaust valve.

6. The valve drive mechanism of claim 5, wherein the specific operation range corresponds to when the engine is starting and wherein during the main valve open period the exhaust valve is open during the exhaust stroke and during the sub valve open period the exhaust valve is open in the compression stroke.

7. The valve drive mechanism of claim 6, wherein during the sub valve open period a mixture flows into an exhaust system during the compression stroke.

8. The valve drive mechanism of claim 7, further comprising an intake valve mechanism comprising:
   a second drive shaft that is configured for rotation about a second axis;
   a intake valve member that is configured to be driven by the rotation of the drive shaft to open and close an intake valve; and
   a intake variable valve mechanism positioned at least partially between the intake valve member and the second drive shaft, the intake variable valve drive mechanism is configured to vary an intake valve open period of the intake valve;
   wherein the intake variable valve mechanism is configured such that, during a specific operation range, the intake valve open period includes a main intake valve open period during which the intake valve is open in the suction stroke, and a sub intake valve open period during which the intake valve is open in the expansion stroke.

9. The valve drive mechanism of claim 5, wherein the specific operation range corresponds to an idling operation range and wherein during the main valve open period the exhaust valve is opened in the exhaust stroke and during the sub valve open period the exhaust valve is open in the compression stroke.

10. The valve drive mechanism of claim 9, wherein during the sub valve open period a mixture flows into an exhaust system during the compression stroke.

11. The valve drive mechanism of claim 1, wherein the drive shaft is an exhaust camshaft that is rotationally supported, the valve member comprises a rocker arm supported for rocking motion, the variable valve mechanism comprises: a rocker cam supported for rocking motion and configured to be driven by the exhaust camshaft, and an intermediate rocker rockably that is interposed between a cam face of the rocker cam and the rocker arm; the intermediate rocker is pressed with the cam face as the rocker cam rocks to rock the rocker arm, and the open period and the lift amount of the exhaust valve is made continuously controllable by changing relative positional relationship between the intermediate rocker and the cam face.

12. The valve drive mechanism of claim 11, wherein the cam face of the rocker cam comprises: a base circle portion, a main lift portion continuous on a fore-end side of the base circle portion, and a sub lift portion formed on a root end side of the base circle portion; a cam nose portion of the exhaust camshaft has a sub nose portion for driving the intermediate rocker in the opening direction using the sub lift portion of the cam face, to bring about the sub valve open period of the exhaust valve in the compression stroke.

13. A valve drive mechanism for an engine, the valve drive mechanism comprising:
    a drive shaft that is configured for rotation about an axis;
    a valve member that is configured to be driven by the rotation of the drive shaft to open and close a valve; and
    a variable valve mechanism positioned at least partially between the valve member and the drive shaft, the variable valve mechanism configured to vary a valve open period of the valve;
    wherein the variable valve mechanism is configured such that, during a specific operation range, the valve open period includes a main valve open period during which the valve is open in a suction or exhaust stroke, and a sub valve open period during which the valve is open in an expansion or compression stroke;
    wherein the drive shaft is an intake camshaft, the valve member comprises a rocker arm supported for rocking motion on a shaft, the variable valve mechanism comprises a rocker cam that is supported for rocking motion and is configured to be driven by the intake camshaft, and an intermediate rocker rockably interposed between a cam face of the rocker cam and the rocker arm; the intermediate rocker configured to be pressed with the cam face as the rocker cam rocks to rock the rocker arm, and the open period and the lift amount of the intake valve is made continuously controllable by changing relative positional relationship between the intermediate rocker and the cam face.

14. The valve drive mechanism of claim 13, wherein the cam face of the rocker cam comprises: a base circle portion, a main lift portion continuous on a fore-end side of the base circle portion, and a sub lift portion formed on a root end side of the base circle portion; a cam nose portion of the intake camshaft has a sub nose portion for driving the intermediate rocker in the opening direction using the sub lift portion of the cam face, to bring about the sub valve open period of the intake valve in the expansion stroke.

15. A valve drive mechanism for an engine, the valve drive mechanism comprising:
    a drive shaft that is configured for rotation about an axis;
    a valve member that is configured to be driven by the rotation of the drive shaft to open and close a valve;
    a variable valve mechanism positioned at least partially between the valve member and the drive shaft, the variable valve mechanism configured to continuously vary a valve open period of the valve; and
    means for opening the valve in a suction or exhaust stroke for a first period of time and opening the valve in an expansion or compression stroke for a second period of time that is smaller than the first period of time
    wherein the variable valve mechanism comprises a rocker cam having a main lift portion on one end and a sub lift portion on an opposite end, the main lift portion configured to engage the valve member during the main valve open period, and the sub lift portion configured to engage the valve member during the sub valve open period.

16. The valve drive mechanism of claim 15, wherein the valve is an intake valve.

17. The valve drive mechanism of claim 16, wherein the first time period is during the suction stroke and the second time period is during in the expansion stroke.

18. The valve drive mechanism of claim 15, wherein the valve is an exhaust valve.

19. The valve drive mechanism of claim 18, wherein during the first time period is during the exhaust stroke and the second time period is during the compression stroke.

20. A method of operating a four-cycle internal combustion engine comprising:
    during a first operating condition, operating the internal combustion engine through a combustion cycle comprising a suction stroke, a compression stroke, an expansion stroke, and an exhaust stroke;
    during the combustion cycle, opening a valve during the suction or the exhaust stroke for a first period of time and then substantially closing the valve; and during the same combustion cycle, opening the same valve during an expansion or compression stroke for a second period of time and then substantially closing the valve;

wherein the valve is opened and closed using a variable valve mechanism, the variable valve mechanism comprising a rocker cam having a main lift portion on one end and a sub lift portion on an opposite end, the main lift portion configured to engage the valve member during the first period of time, and the sub lift portion configured to engage the valve member during the second period of time.

21. The method of claim 20, wherein the second period of time is less than the first period of time.

22. The method of claim 20, wherein the step of opening the valve during the suction or exhaust stroke for a first period of time comprises opening an intake valve during the suction stroke.

23. The method of claim 22, wherein the step of opening the same valve during the expansion or compression stroke for a second period of time comprises opening the intake valve during the expansion stroke.

24. The method of claim 20, wherein the step of opening the valve during the suction or exhaust stroke for a first period of time comprises opening an exhaust valve during the exhaust stroke.

25. The method of claim 24, wherein the step of opening the same valve during the expansion or compression stroke for a second period of time comprises opening the exhaust valve during the compression stroke.

26. A method of operating a four-cycle internal combustion engine comprising:

during a first operating condition, operating the internal combustion engine through a combustion cycle comprising a suction stroke, a compression stroke, an expansion stroke, and an exhaust stroke;

during the combustion cycle, opening a valve during the suction or the exhaust stroke for a first period of time and then substantially closing the valve;

during the same combustion cycle, opening the same valve during an expansion or compression stroke for a second period of time and then substantially closing the valve; and further comprising, during a second operating condition, operating the internal combustion engine through a second combustion cycle comprising a suction stroke, a compression stroke, an expansion stroke, and an exhaust stroke, opening the valve during the suction or exhaust stroke for the third period of time and not opening the same valve during an expansion or compression stroke.

27. The method of claim 26, wherein operating the first operating conditions corresponds to a condition in which the internal combustion engine is starting.

28. A method of operating a four-cycle internal combustion engine comprising:

during a first operating condition, operating the internal combustion engine through a combustion cycle comprising a suction stroke, a compression stroke, an expansion stroke, and an exhaust stroke;

during the combustion cycle, opening a valve during the suction or the exhaust stroke for a first period of time and then substantially closing the valve;

during the same combustion cycle, opening the same valve during an expansion or compression stroke for a second period of time and then substantially closing the valve; and wherein operating the first operating conditions corresponds to a condition in which the internal combustion engine is idling.

\* \* \* \* \*